(12) United States Patent
Maeda

(10) Patent No.: US 6,272,090 B1
(45) Date of Patent: Aug. 7, 2001

(54) DISK DRIVE HAVING A DISK TRAY

(75) Inventor: Nobunari Maeda, Gunma (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/303,563

(22) Filed: May 3, 1999

(30) Foreign Application Priority Data

May 7, 1998 (JP) ................................................. 10-124487

(51) Int. Cl.[7] ............................ G11B 17/04; G11B 33/02
(52) U.S. Cl. ........................................ 369/77.1; 369/75.1
(58) Field of Search .................................. 369/75.1, 75.2, 369/77.1, 77.2; 360/99.02, 99.03, 99.06, 99.07

(56) References Cited

U.S. PATENT DOCUMENTS

| | | | |
|---|---|---|---|
| 5,883,870 | * | 3/1999 | Akiba et al. .......................... 369/77.1 |
| 5,963,528 | * | 10/1999 | Fujimura et al. .................... 369/77.1 |
| 5,963,529 | * | 10/1999 | Kabasawa ............................ 369/77.2 |
| 6,111,838 | * | 8/2000 | Akiba .................................... 369/77.1 |

FOREIGN PATENT DOCUMENTS

| | | | |
|---|---|---|---|
| 297 08 890 U | * | 8/1997 | (DE) . |
| 61-134957 | * | 6/1986 | (JP) . |
| 63-53747 | * | 3/1988 | (JP) . |
| 63-231762 | * | 9/1988 | (JP) . |
| 3-160682 | * | 7/1991 | (JP) . |
| 5-101629 | | 4/1993 | (JP) . |
| 7-296477 | | 11/1995 | (JP) . |
| 8-138300 | * | 5/1996 | (JP) . |
| 8-235717 | * | 9/1996 | (JP) . |
| 8-287570 | * | 11/1996 | (JP) . |
| 8-321151 | | 12/1996 | (JP) . |

* cited by examiner

Primary Examiner—David L. Ometz
(74) Attorney, Agent, or Firm—Foley & Lardner

(57) ABSTRACT

An optical disk drive has a disk tray for mounting thereon an optical disk and an insertion/ejection mechanism for the disk tray to load or unload the disk on the disk drive. The push button for controlling the insertion/ejection mechanism is mounted on the front end of the disk tray, thereby allowing a user to depress the push button without difficulty and without application of the thrust force to the insertion/ejection mechanism even when the disk tray is in an ejected position.

5 Claims, 9 Drawing Sheets

DISK DRIVE HAVING A DISK TRAY

BACKGROUND OF THE INVENTION (a) Field of the Invention

The present invention relates to a disk drive having a disk tray and, more particularly, to a disk drive having a push button for inserting/ejecting the disk tray.

(b) Description of the Related Art

Disk drives having disk trays therein are widely used in computer systems for driving optical disks or cartridge disks. FIG. 1 shows a conventional optical disk drive in a front view thereof. The optical disk drive, generally designated by numeral 30, includes a housing 31 for defining a slot therein, a disk tray (not shown) received in the slot for mounting thereon an optical disk, and an insertion/ejection mechanism (not shown) for the disk tray to insert/eject the optical disk into/from the slot. The insertion/ejection mechanism is driven by a drive motor not shown.

The optical disk drive 30 further includes a shutter or flap 32 disposed at the front entrance of the slot, the shutter 32 being closed when the disk tray is received in the slot and opened when at least a portion of the disk tray is outside the slot. The optical disk drive 30 further includes a push button 33 disposed on the front panel of the housing 31, generally at a location below the right portion of the shutter 32, for controlling the insertion/ejection of the disk tray.

It is generally difficult to depress the push button 33 when the disk tray is ejected from the slot because the push button 33 is located below the disk tray. To overcome the difficulty in depressing the push button 33 for insertion of the ejected disk tray, most conventional optical disk drives use a configuration wherein the insertion/ejection mechanism is controlled for insertion of the disk tray by a location sensor that detects the location of the disk tray being slightly deviated from the original ejected position of the disk tray due to a slight thrust force applied by the user to the front end of the disk tray toward the slot.

However, the thrust force applied to the front end of the disk tray also acts on the insertion/ejection mechanism. The thrust force is not generally controlled because the thrust force depends on control by the user, which may cause a malfunction or damage in the insertion/ejection mechanism due to an excess thrust force. Thus, the reliability of the optical disk drives is deteriorated, especially in an initial service period of the disk drive.

SUMMARY OF THE INVENTION

In view of the above, it is an object of the present invention to provide a disk drive having a push button that allows control of insertion and/or ejection of the disk tray without difficulty for assuring the reliability of the disk drive.

The present invention provides a disk drive comprising a housing for defining a slot therein, a disk tray slidably mounted on the housing between an ejected position and an inserted position with respect to the slot, an insertion/ejection mechanism for moving the disk tray between the ejected position and the inserted position, and a first push button, mounted on a front end of the disk tray, for controlling the insertion/ejection mechanism to move the disk tray.

In accordance with the disk drive of the present invention, the first push button provided on the front end of the disk tray allows depression of the first push button without difficulty and without application of the thrust force to the insertion/ejection mechanism of the disk drive, thereby preventing a malfunction or damage of the insertion/ejection mechanism, which assures the reliability of the disk drive.

The above and other objects, features and advantages of the present invention will be more apparent from the following description, referring to the accompanying drawings.

PREFERRED EMBODIMENTS OF THE INVENTION

Figure 1:
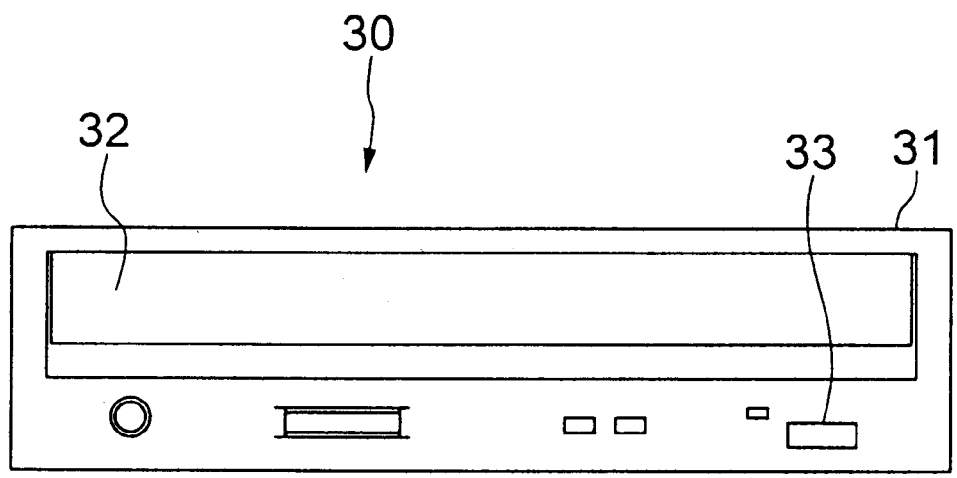
FIG. 1 is a front view of a conventional disk drive.

Now, the present invention is more specifically described with reference to accompanying drawings, wherein similar constituent elements are designated by similar reference numerals.

Figure 2A:
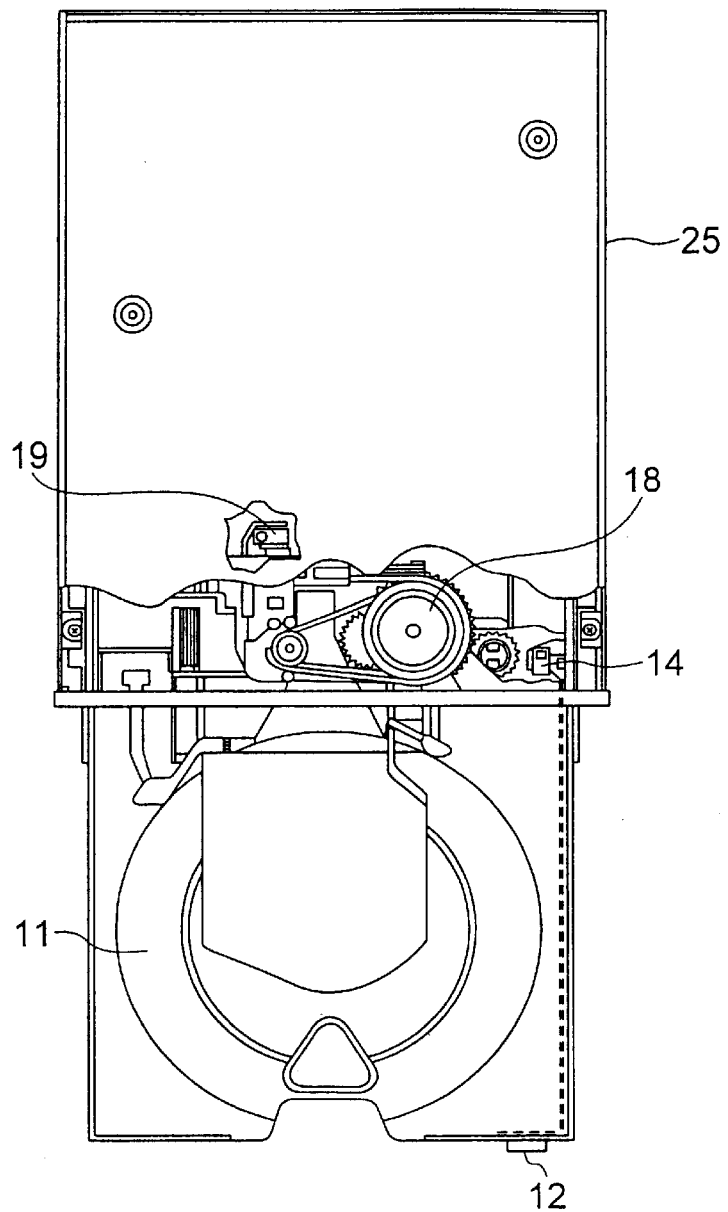
FIG. 2A is a partial-broken top plan view of a disk drive according to a first embodiment of the present invention, with the disk tray being in an ejected position.
Figure 2B:
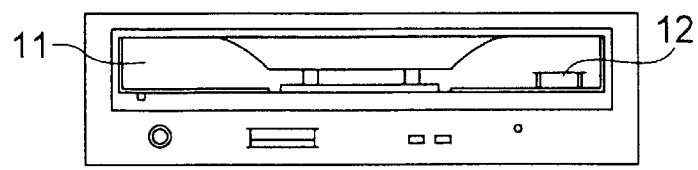
FIG. 2B is a front view thereof.

Referring to FIGS. 2A and 2B, a disk drive according to a first embodiment of the present invention is directed to an optical disk drive for mounting thereon an optical disk. The optical disk drive includes a housing 25 for defining a slot therein, a disk tray 11 inserted/ejected into/from the slot while mounting thereon an optical disk, and an insertion/ejection mechanism 18 received in the housing 25 for inserting/ejecting the disk tray 11 and having a motor not shown. The disk tray 11 mounts thereon an inner push button 12 at a right side, as viewed from the front, of the front end of the disk tray 11. The inner push button 12 can be depressed in the illustrated, ejected position of the disk tray 11 without difficulty for moving the disk tray 11 into an inserted position.

Figure 3A:
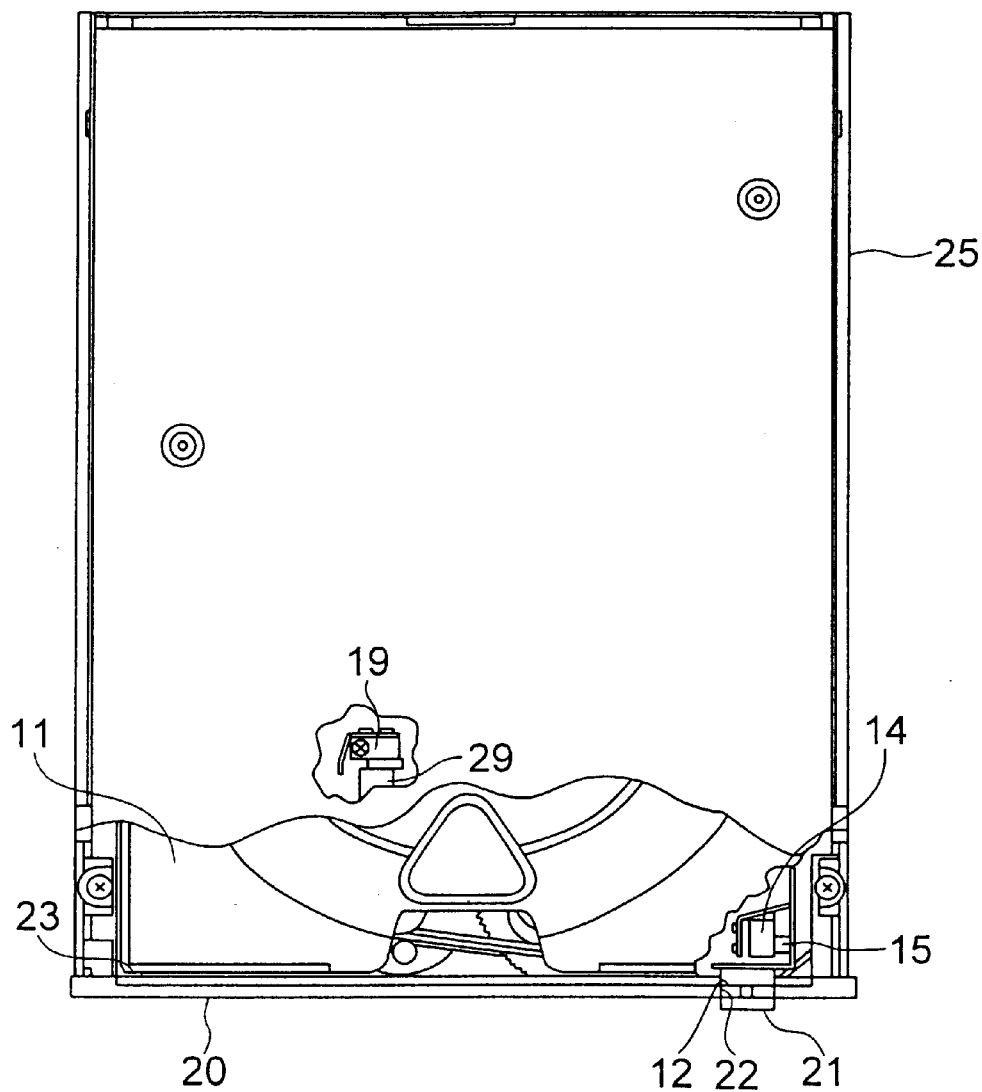
FIG. 3A is a partial-broken top plan view of the disk drive of FIGS. 2A and 2B, with the disk tray being in an inserted position.
Figure 3B:
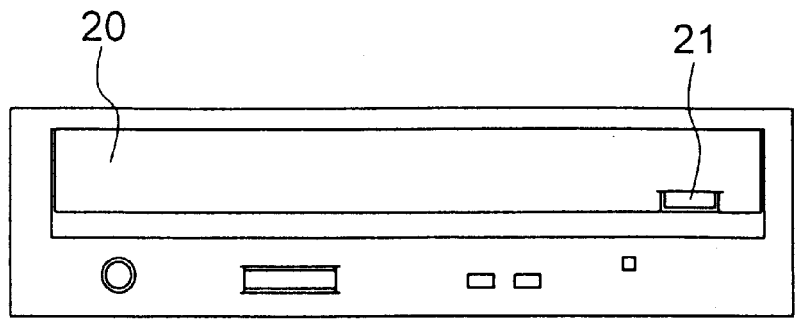
FIG. 3B is a front view thereof.

Referring to FIGS. 3A and 3B, the disk drive further includes a shutter or flap 20 at the front entrance 23 of the slot, the shutter 20 being retracted from the front entrance 23 of the slot when at least a portion of the disk tray 11 is outside the slot. An outer push button 21 is mounted on the shutter 20 at the front of the inner push button 12 for applying a thrust force to the inner push button 12 when the disk tray 11 is in the inserted position and thus the shutter 20 is closed. The outer push button 21 is urged by a spring 22 toward the front.

Figure 4:
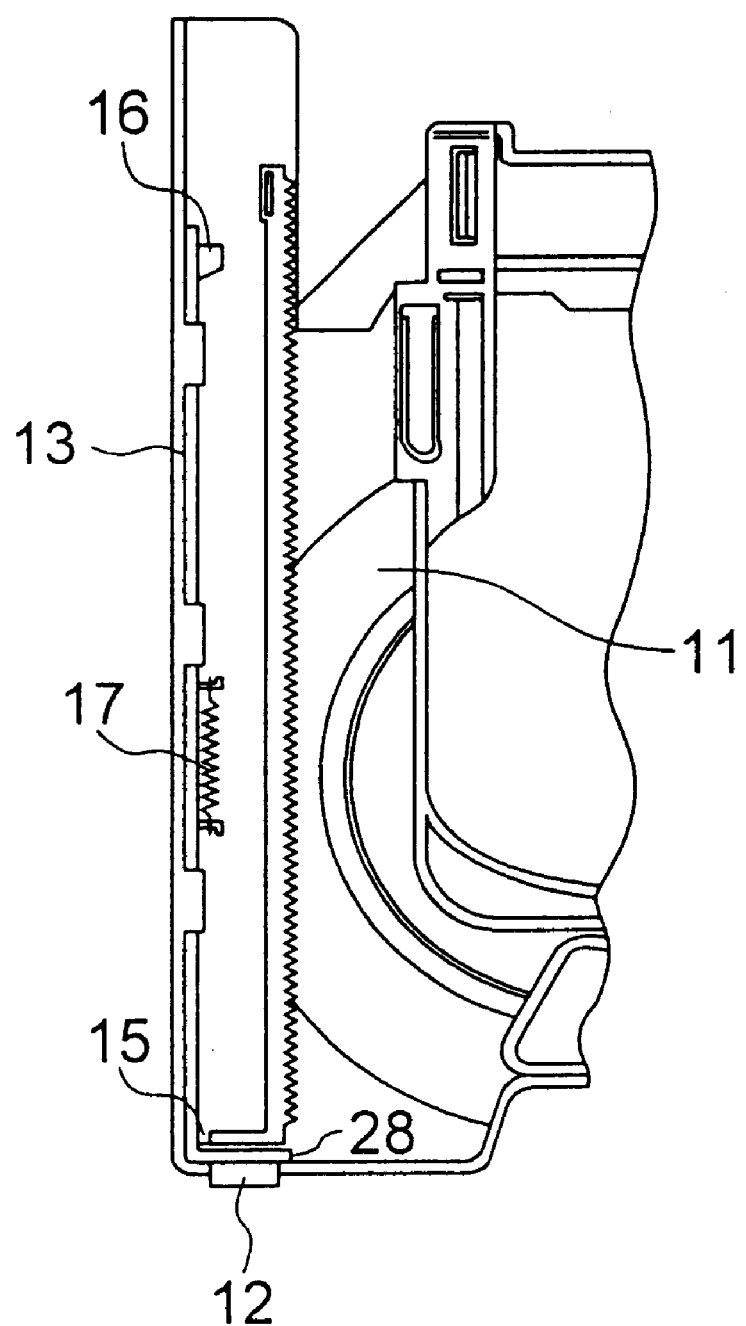
FIG. 4 is a bottom view of the disk tray in the ejected position of FIGS. 2A and 2B.

Referring to FIG. 4, a rod 13 is slidably mounted on the disk tray 11, extending in the longitudinal direction of the slot. The rod 13 has a front abutment 28, which abuts against the rear surface of the inner push button 12, which shifts the rod 13 in the longitudinal direction upon depression of the inner push button 12. The rod 13 is provided with a first thrust member 15 and a second thrust member 16 at the front and rear portions, respectively, of the rod 13 both for thrusting an unload sensor 14 shown in FIG. 2A. The rod 13 is urged by a spring 17 toward the front against the rear surface of the inner push button 12.

In operation, when the disk tray 11 is in an ejected position outside the slot, a load sensor 19 is released, whereas the unload sensor 14 is engaged with the second thrust member 16 to generate an ejected signal. When the disk tray 11 is in an inserted position inside the slot, as shown in FIG. 3A, the load sensor 19 is engaged with a third thrust member 29 fixed on the disk tray 11 to generate a loaded signal, whereas the unload sensor 14 is released from the second thrust member 16. In this state, if the outer push button 21 is depressed, the inner push button 12 is also depressed by the outer push button 21 against the spring 17 to urge the rod 13 toward the rear end of the slot, thereby allowing the first thrust member 15 to engage with the unload sensor 14.

The unload sensor 14, when engaged with the first thrust member 15, generates an ejecting signal, which controls the insertion/ejection mechanism to eject the disk tray 11 from the slot, which makes the load sensor 19 and the unload sensor 14 released from and engaged with, respectively, thrust members 29 and 16. In this state, the shutter 20 is retracted from the entrance 23.

The disk tray 11 is then stopped at the ejected position, as shown in FIG. 2A, when the unload sensor 14 is engaged with the second thrust member 16. In this state, when the inner push button 12 is depressed, the unload sensor 14 is released from the second thrust member 16 to generate an inserting signal, which controls the insertion/ejection mechanism to insert the disk tray 11 into the slot until the load sensor 19 generates a loaded signal in the inserted position. After the disk tray 11 is received in the inserted position, the shutter 20 advances to cover the entrance 23 of the slot.

In the disk drive of the present embodiment, insertion/ejection of the disk tray 11 can be controlled by push buttons 12 and 21 located at the front end of the disk drive or the disk tray 11. Thus, the difficulty encountered in the conventional disk drive can be eliminated without involving malfunction or damage of the insertion/ejection mechanism of the disk drive which might be caused by the thrust force applied thereto.

Figure 5A:
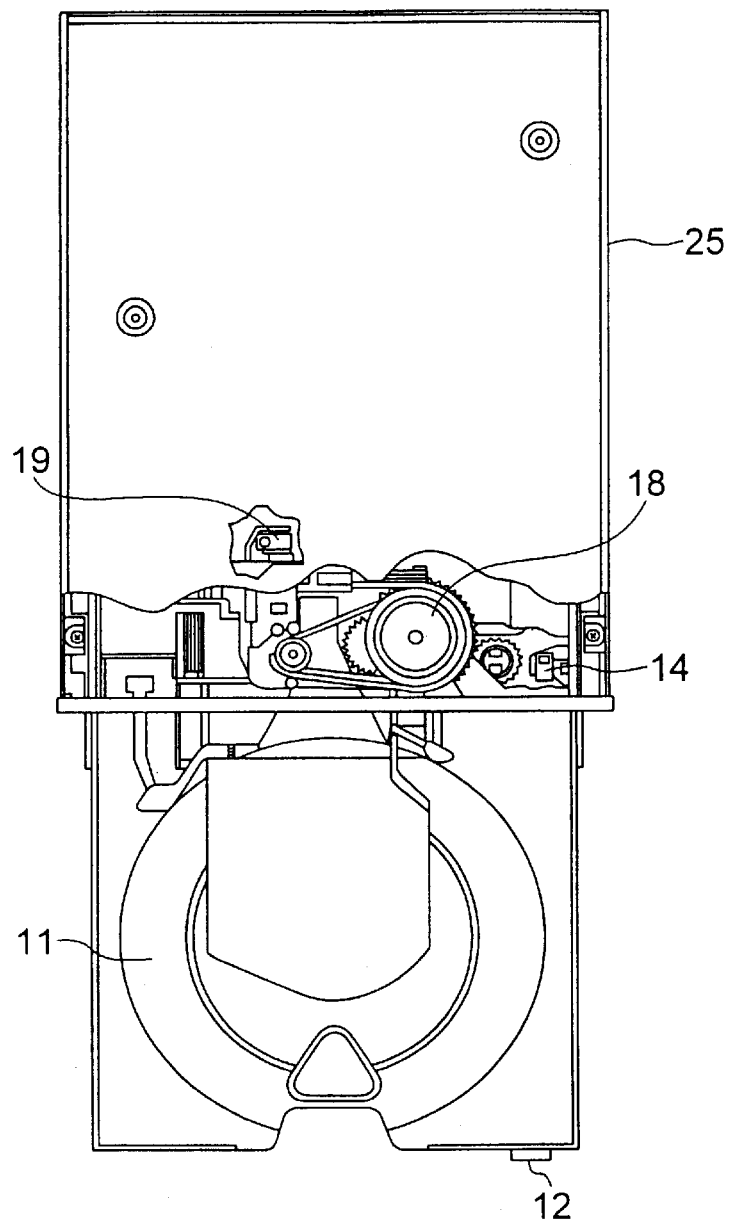
FIG. 5A is a partial-broken top plan view of a disk drive according to a second embodiment of the present invention, with the disk tray being in an ejected position.
Figure 5B:
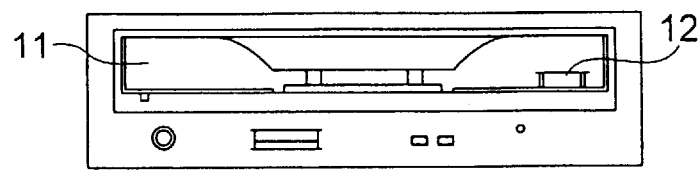
FIG. 5B is a front view thereof.

Referring to FIGS. 5A, 5B, 6A, 6B and 7 showing, similar to FIGS. 2A, 2B, 3A, 3B and 4, a disk drive according to a second embodiment of the present invention is shown. The disk drive of the present embodiment is similar to the first embodiment except for a switch 24 provided in the present embodiment instead of the rod 13 and associated members in the first embodiment. Specifically, the switch 24 is of a type that returns to a normal state thereof due to a spring function after a thrust force is stopped. The switch 24 is disposed at the rear side of the inner push button 12 and depressed upon depression of the push button 12 to generate a trigger signal. When the disk tray 11 is in an ejected position, as shown in FIGS. 5A and 5B, the load sensor 19 and the unload sensor 14 are released from the third thrust member 29 and engaged with the second thrust member 16, respectively. In this state, if the inner push button 12 is depressed, the switch 24 generates an inserting signal to allow the insertion/ejection mechanism to insert the disk tray 11 into the slot until the load sensor 19 generates a loaded signal in the inserted position. After the disk tray 11 is received in the inserted position, the shutter 20 advances to cover the entrance 23 of the slot.

In the inserted position or loaded state, the outer push button 21, if depressed against a spring 22, thrusts the inner push button 12, whereby the insertion/ejection mechanism ejects the disk tray 11 into an ejected position. Specifically, upon depression of the outer push button 21, the switch 24 is closed by the inner push button 12 to generate an ejecting signal, which allows the insertion/ejection mechanism to eject the disk tray 11 until the unload sensor 14 detects an ejected position. In the present embodiment, advantages similar to those in the first embodiment can be obtained.

Figure 9A:
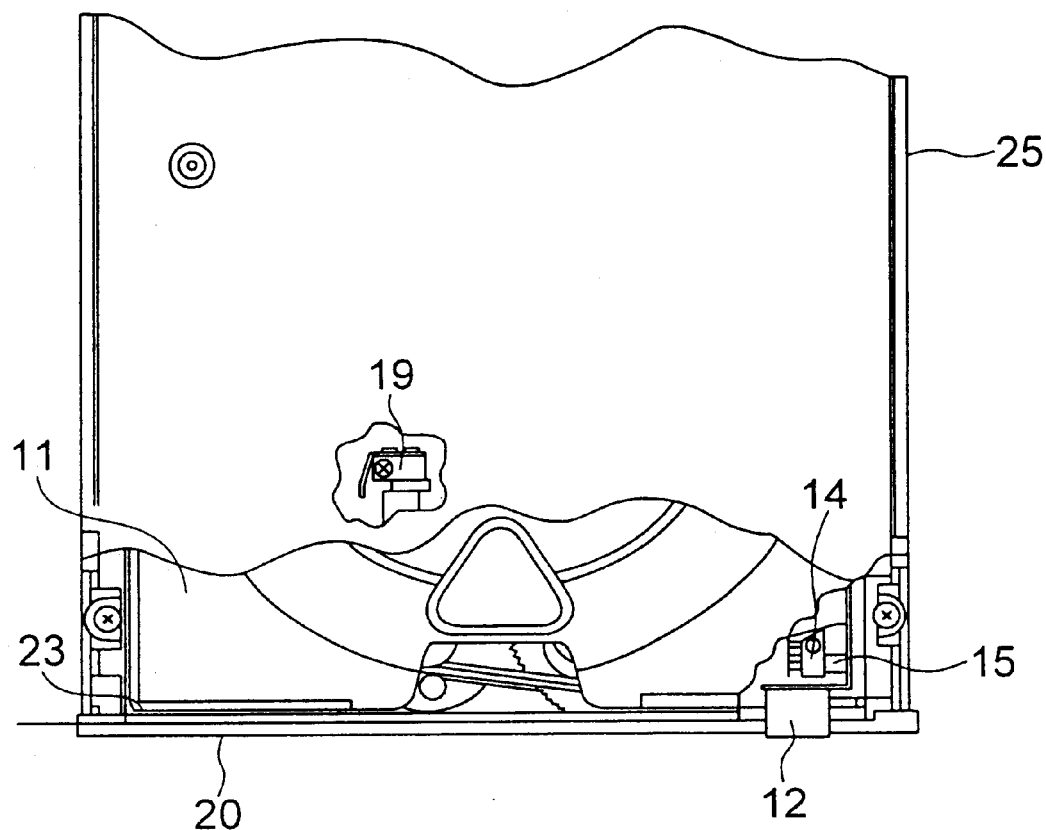
FIG. 9A is a partial-broken top plan view of a disk drive modified from the disk drive of FIGS. 8A and 8B.
Figure 9B:
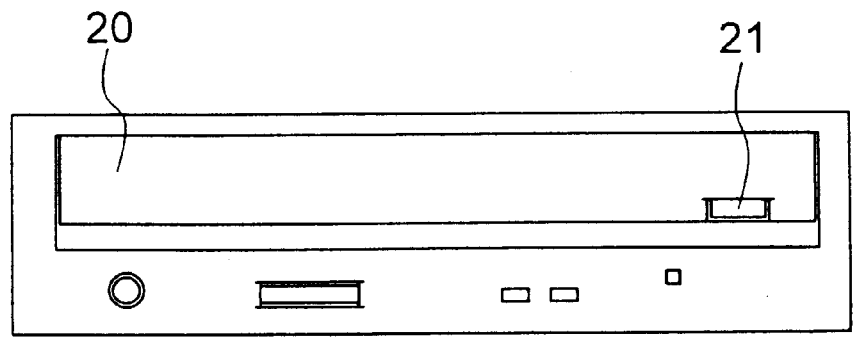
FIG. 9B is a front view thereof.

Referring to FIGS. 9A and 9B showing, similar to FIGS. 3A and 3B, a disk drive according to a third embodiment of the present invention is shown. The disk drive of the present embodiment is similar to the first embodiment, except that the inner push button 12 mounted on the disk tray 11 is exposed from an opening of the shutter 20 in the present embodiment instead of provision of the outer push button 21 in the first embodiment. The rear surface of the inner push button depresses the rod 13 as in the case of the first embodiment. The front surface of the inner push button 12 is substantially flush with the front surface of the shutter 20. The operation of the disk drive of the present embodiment is similar to that in the first embodiment.

Figure 6A:
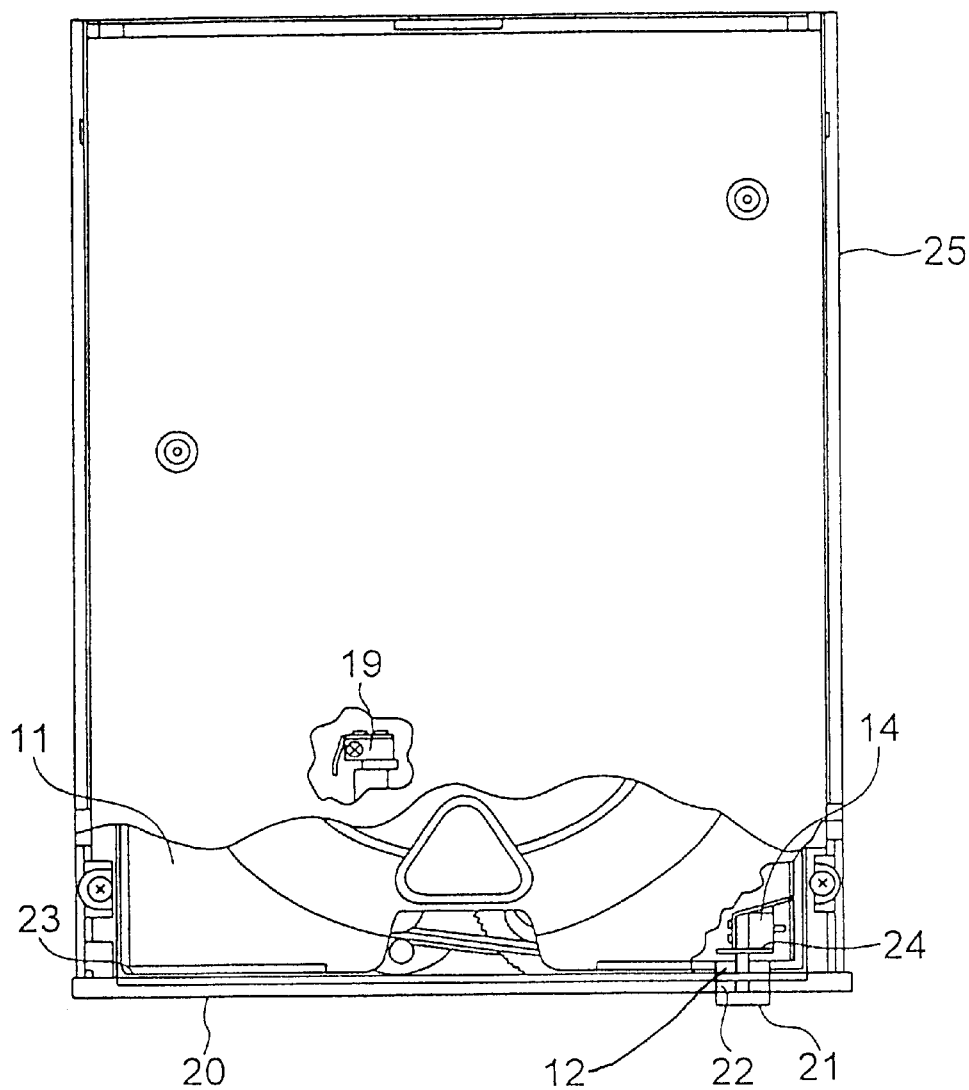
FIG. 6A is a partial-broken top plan view of the disk drive of FIGS. 5A and 5B, with the disk tray being in an inserted position.
Figure 6B:
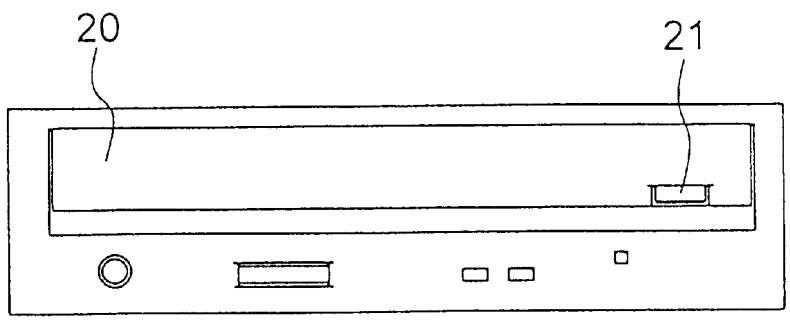
FIG. 6B is a front view thereof.
Figure 7:
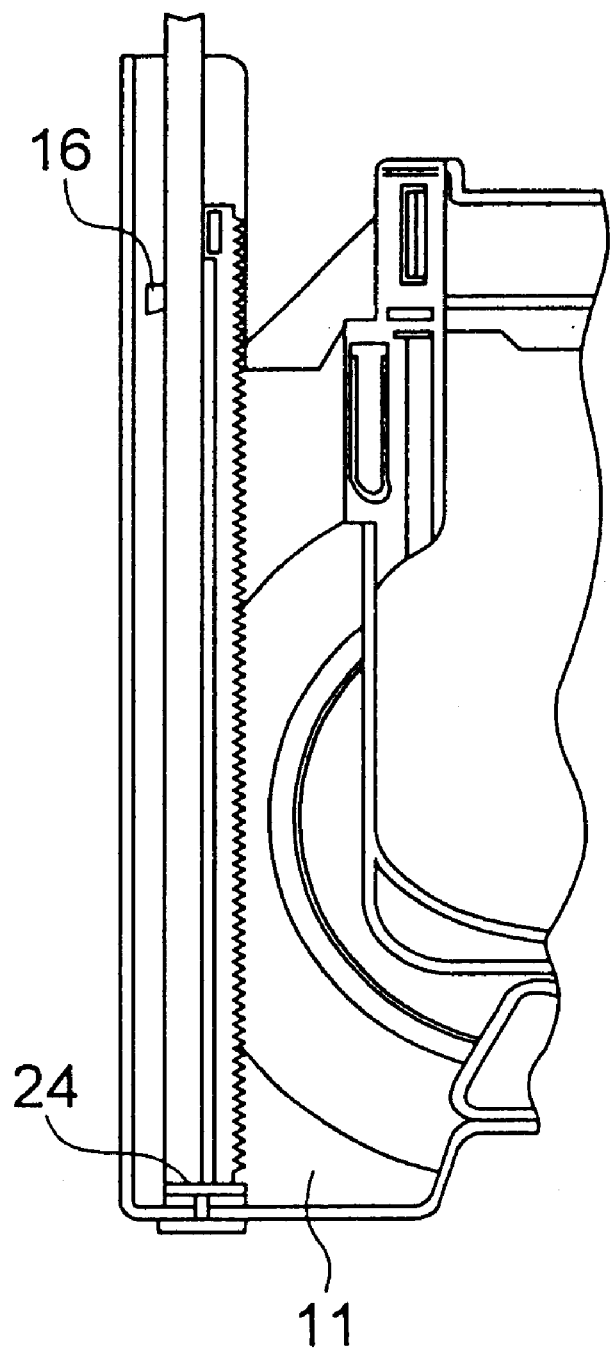
FIG. 7 is a bottom view of the disk tray in the ejected position of FIGS. 5A and 5B.
Figure 8A:
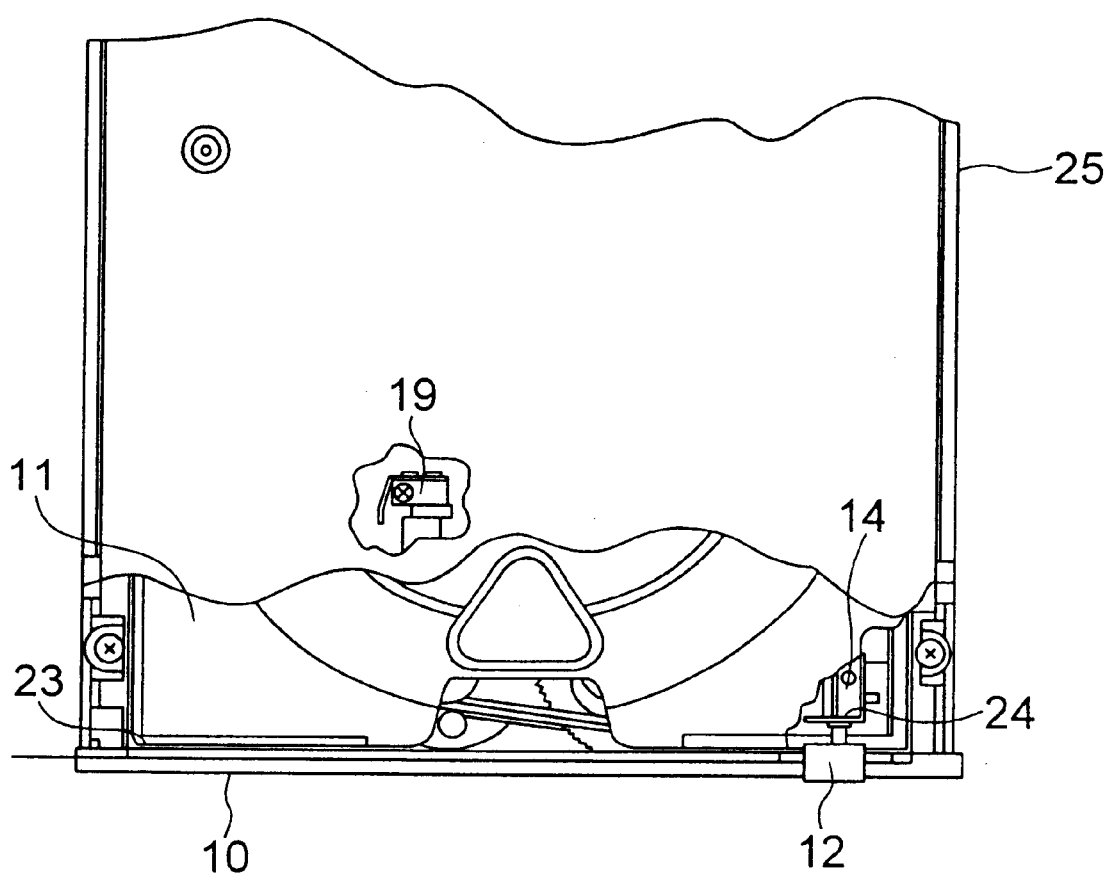
FIG. 8A is a partial-broken top plan view of a disk drive according to a third embodiment of the present invention, with the disk tray being in an ejected position.
Figure 8B:
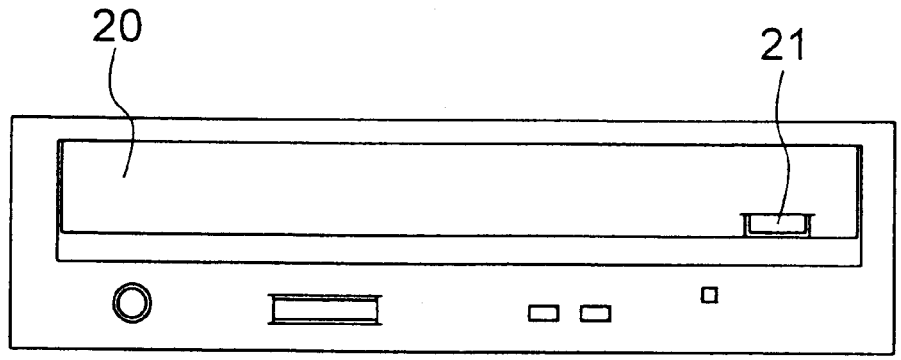
FIG. 8B is a front view thereof.

Referring to FIGS. 8A and 8B showing, similar to FIGS. 6A and 6B, a modification of the third embodiment, the disk drive of the modified embodiment includes an inner push button 12 which depresses the switch 24 similar to the second embodiment. The rest of the configuration is similar to the third embodiment.

Since the above embodiments are described only for examples, the present invention is not limited to the above embodiments and various modifications or alterations can be easily made therefrom by those skilled in the art without departing from the scope of the present invention. For example, the disk tray may be of any type such as formed by a frame so long as the disk tray can carry a disk and has a front end.

What is claimed is:

1. A disk drive comprising:
   a housing for defining a slot therein;
   a disk tray slidably mounted on said housing between an ejected position and an inserted position with respect to said slot;
   an insertion/ejection mechanism for moving said disk tray between said ejected position and said inserted position;
   a first push button, mounted on a front end of said disk tray, for controlling said insertion/ejection mechanism to move said disk tray;
   a shutter for opening/closing an entrance of said slot; and
   a second push button, mounted on said shutter, in operative relationship with said first push button, said second push button depressing said first push button upon depression of said second push button when said shutter is closed while said disk tray is in said inserted position.

2. The disk drive as defined in claim 1, further comprising: said shutter having an opening for exposing therethrough said first push button.

3. The disk drive as defined in claim 1 further comprising a switch disposed in operative relationship with said first push button, said switch being depressed upon depression of said first push button to generate a control signal for said insertion/ejection mechanism.

4. A disk drive comprising:

a housing for defining a slot therein;

a disk tray slidably mounted on said housing between an ejected position and an inserted position with respect to said slot;

an insertion/ejection mechanism for moving said disk tray between said ejected position and said inserted position;

a first push button, mounted on a front end of said disk tray, for controlling said insertion/ejection mechanism to move said disk tray;

a rod disposed in operative relationship with said first push button;

a first detection member for detecting said ejected position based on location of said rod; and a second detection member for detecting depression of said first push button based on location of said rod.

5. The disk drive as defined in claim 4 further comprising a third detection member for detecting said inserted position based on a location of said disk tray.

* * * * *